US012772321B2

(12) United States Patent
Gopalsamy et al.

(10) Patent No.: US 12,772,321 B2
(45) Date of Patent: Oct. 20, 2026

(54) SYSTEM AND METHOD FOR DETERMINING A PRIORITY ORDER TO DESYNCHRONIZE PAUSE OPERATIONS

(71) Applicant: ZEBRA TECHNOLOGIES CORPORATION, Lincolnshire, IL (US)

(72) Inventors: Anandakumar Gopalsamy, Ronkonkoma, NY (US); Dayal Madhukar Rai, Bangalore (IN); Ohad Shatil, Dunwoody, GA (US); Ambika Nagarajaiah, Bangalore (IN); Venkateswaran Narayanan, Bangalore (IN); Kannan J., Udangudi (IN); Sateesh V. Angadi, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 529 days.

(21) Appl. No.: 18/196,208

(22) Filed: May 11, 2023

(65) Prior Publication Data

US 2024/0381473 A1 Nov. 14, 2024

(51) Int. Cl.
*H04W 76/20* (2018.01)

(52) U.S. Cl.
CPC .................................. *H04W 76/20* (2018.02)

(58) Field of Classification Search
None
See application file for complete search history.

(56) References Cited

U.S. PATENT DOCUMENTS

2021/0235310 A1* 7/2021 Monajemi ......... H04W 28/0221
2024/0129967 A1* 4/2024 Guduru ................. H04W 76/14

* cited by examiner

*Primary Examiner* — Jae Y Lee
*Assistant Examiner* — Nam P. Cao

(57) ABSTRACT

An example computing device includes: a wireless communications interface configured to connect to a network deployed by a plurality of access points; a controller for the wireless communications interface, the controller configured to, during an ongoing packet exchange with a peer computing device: detect a target pause operation for the computing device to pause a connection to a home access point; in response to the pause condition, obtain a connection status of the peer computing device; determine a priority order of the computing device and the peer computing device based on the connection status and the target pause operation; and pause the connection to the home access point according to the determined priority order.

21 Claims, 7 Drawing Sheets

SYSTEM AND METHOD FOR DETERMINING A PRIORITY ORDER TO DESYNCHRONIZE PAUSE OPERATIONS

BACKGROUND

Wireless networks may be serviced by several access points to which devices can connect. Devices may periodically pause their connection to the home access point to which they are connected, for example to scan for other nearby access points, to roam to a new access point, or the like. When two devices are connected in an ongoing packet exchange during a voice call, mutual paused communication at both devices may cause dropped packets and distortions in the voice call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
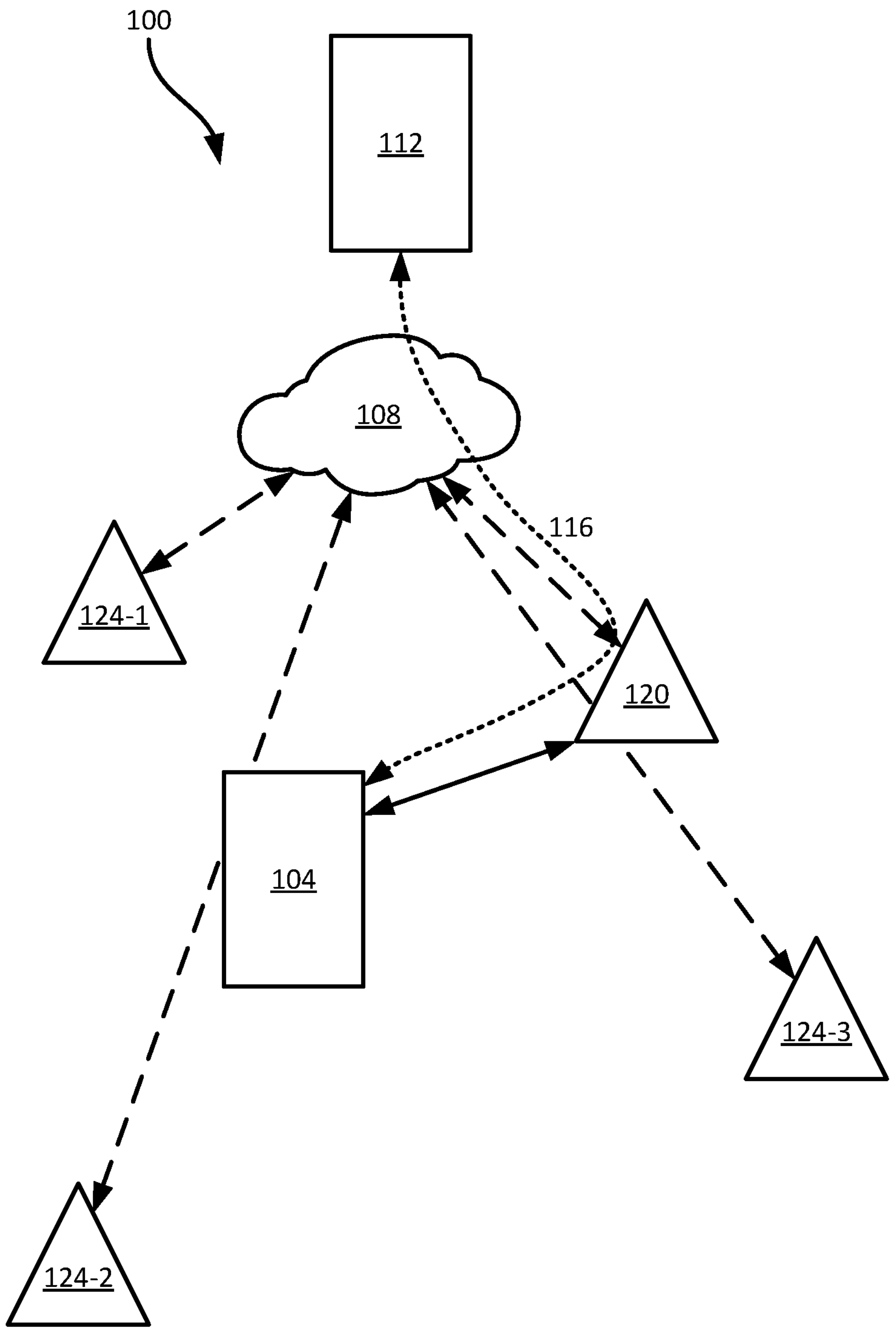
FIG. 1 is a schematic diagram of an example system for determining a priority order to desynchronize pause operations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device comprising: a wireless communications interface configured to connect to a network deployed by a plurality of access points: a controller for the wireless communications interface, the controller configured to, during an ongoing packet exchange with a peer device: detect a target pause operation for the computing device to pause a connection to a home access point: in response to the target pause operation, obtain a connection status of the peer computing device: determine a priority order of the computing device and the peer device based on the connection status and the target pause operation: and pause the connection to the home access point according to the determined priority order.

Additional examples disclosed herein are directed to a method comprising, in a computing device during an ongoing packet exchange with a peer device: detecting a target pause operation for the computing device to pause a connection to a home access point: in response to the target pause operation, obtaining a connection status of the peer device: determine a priority order of the computing device and the peer device based on the connection status and the target pause operation: and pause the connection to the home access point according to the determined priority order.

FIG. 1 depicts a system 100 for determining a priority order to desynchronize pause operations in accordance with the teachings of this disclosure. The system 100 includes a computing device 104 (also referred to herein as simply the device 104) connected to a network 108. The device 104 may communicate with a second computing device 112 (also referred to herein as the peer device 112) via a link 116 which traverses the network 108. In some examples, the device 112 may be remote from the device 104 and the link 116 may therefore additionally traverse one or more wide-area networks such as the Internet, mobile networks and the like.

The device 104 may be a mobile computing device such as a handheld computer, a mobile phone, a tablet, a barcode scanner or the like. As noted above, the device 104 is connected to the network 108, which may be deployed for wireless communications within a facility, such as a transportations and logistics facility, a warehouse, retail establishment, or other facility. Accordingly, the network 108 may be a wireless local area network (WLAN) deployed by one or more access point. In the present example, four example access points, a home access point 120, and three foreign access points 124-1, 124-2, and 124-3 are depicted. In other examples, the network 108 may include more or fewer access points.

In particular, the device 104 may be currently serviced by the home access point 120 to connect to the network 108. The device 104 may occasionally pause its connection to the home access point 120 including wireless transmissions to and from the home access point 120 for a variety of reasons.

For example, since the device 104 may be mobile, the device 104 may be carried about by a user. As the user of the device 104 moves about the facility or other region serviced by the network 108, the connection of the device 104 to the home access point 120 may weaken, and the device 104 may be better serviced by another foreign access point 124 of the network 108. Accordingly, the device 104 may scan the foreign access points 124 and may subsequently roam to one of the foreign access points 124 to connect to the network 108, for example when the device 104 is out of range of the home access point 120 and/or when a better connection may be achieved via one of the foreign access points 124. Scanning operations and roaming operations may both cause the device 104 to pause its connection to the home access point 120. Other conditions may also initiate a pause operation. Similarly, the peer device 112 may perform pause operations from time to time, causing paused communications to its access point.

During an ongoing packet exchange, for example to exchange voice packets during a voice call, the paused connection to the home access point 120 may cause packets to be buffered to be sent to and from the device 104. To account for some delays in packet exchange, many applications include a jitter buffer to buffer packets. If the duration of the pause operation of the device 104 is within the jitter buffer, then no packets are dropped and the quality of the communications between the device 104 and the peer device 112 is maintained. However, if both the device 104 and the peer device 112 with which the device 104 is communicating simultaneously perform a pause operation, then the combined length of the pause operations may exceed the jitter buffer, resulting in lost packets and decreased quality of communications.

Thus, in accordance with the present disclosure, in response to detecting a pause condition of the computing device (i.e., an upcoming or target pause operation detected by the computing device) and prior to performing the pause operation, the device 104 may negotiate a priority order with the peer device 112 to desynchronize the respective pause operations.

Figure 2:
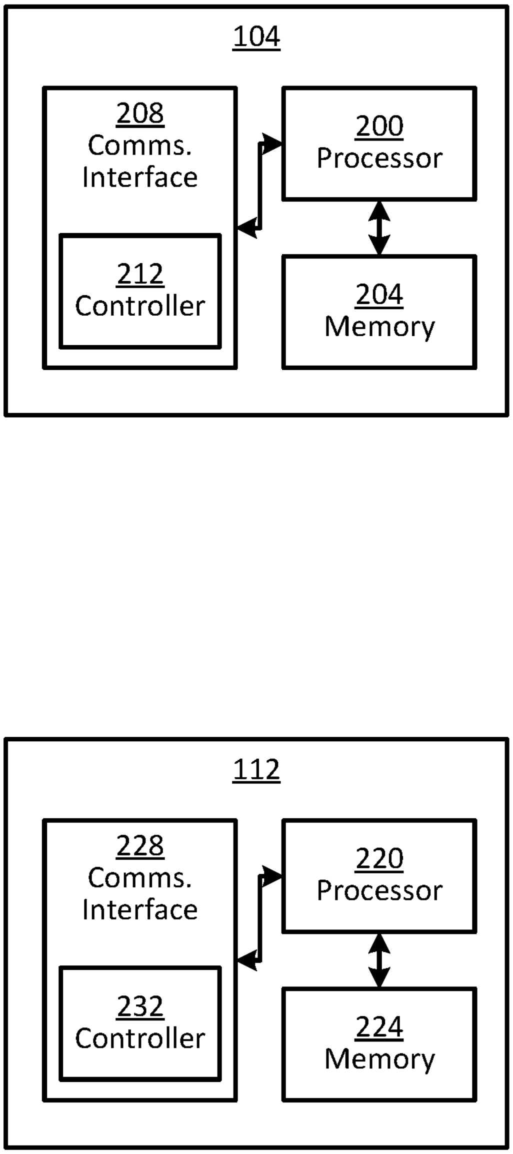
FIG. 2 is a block diagram of certain internal hardware components of the computing device and the peer device of FIG. 1.

Turning now to FIG. 2, certain internal components of the computing devices 104 and 112 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits. The memory 204 stores computer-readable instructions for execution by the processor 200, including one or more applications which, when executed, configure the processor 200 to perform the various functions of the device 104.

The device 104 further includes a communications interface 208 enabling the device 104 to exchange data with other computing devices, such as the device 112. The communications interface 208 is interconnected with the processor 200. The communications interface 208 includes a controller 212, and one or more antennas, transmitters, receivers, or the like (not shown), to allow the device 104 to communicate with other computing devices such as the device 112 via the link 116.

The controller 212 may be a micro-controller, a microprocessor, or other suitable device capable of executing computer-readable instructions to control the components, such as the antennae, transmitters, receivers, and the like, of the communications interface 208 to perform the functionality described herein. The controller 212 may comprise one or more integrated circuits and may include and/or be interconnected with a non-transitory computer-readable storage medium storing computer-readable instructions which when executed configure the controller 212 and/or the communications interface 208 to perform the functionality described herein. In particular, the controller 212 may control an operation to negotiate a priority order of performing pause operations to desynchronize the pause operations.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

The device 112 is similar to the device 104 and includes a processor 220 interconnected with a non-transitory computer-readable storage medium, such as a memory 224. The device 112 further includes a communications interface 228 enabling the device 112 to exchange data with other computing devices, such as the device 104. The communications interface 208 includes a controller 232, and one or more antennas, transmitters, receivers, or the like (not shown), to allow the device 112 to communicate with other computing devices such as the device 104 via the link 116.

The controller 232 may be a micro-controller, a microprocessor, or other suitable device capable of executing computer-readable instructions to control the components, such as the antennae, transmitters, receivers, and the like, of the communications interface 208 to perform the functionality described herein. In particular, the controller 232 may control an operation to negotiate a priority order of performing pause operations to desynchronize the pause operations.

The device 112 may further include one or more input and/or output devices (not shown) suitable to allow an operator to interact with the device 112. The input devices may include one or more buttons, keypads, touch-sensitive display screens or the like for receiving input from an operator. The output devices may further include one or more display screens, sound generators, vibrators, or the like for providing output or feedback to an operator.

Figure 3:
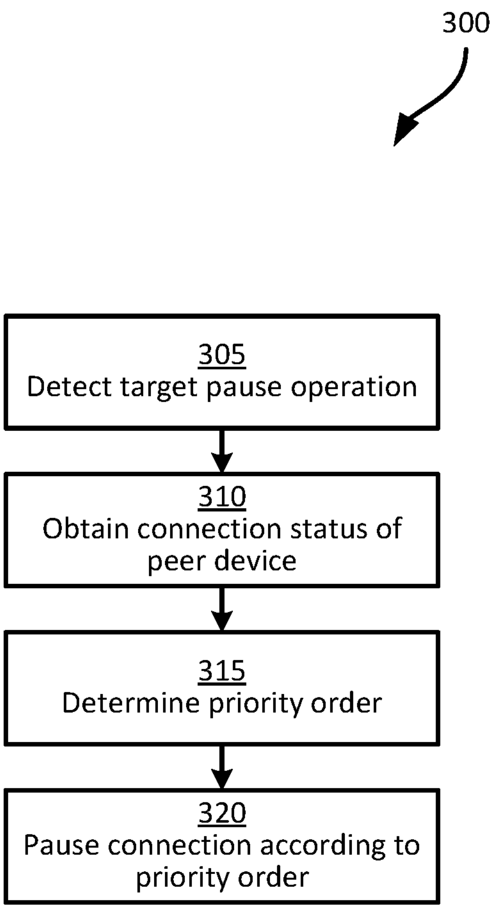
FIG. 3 is a flowchart of a method for determining a priority order to desynchronize pause operations.

FIG. 3 illustrates a method 300 of negotiating a priority order to desynchronize pause operations. The method 300 will be discussed in conjunction with its performance in the system 100, and particularly by the device 104. In particular, the method 300 will be described with reference to the components of FIGS. 1 and 2, as the device 104 interacts with the device 112. In other examples, the method 300 may be performed by other suitable devices and/or in other suitable systems.

The method 300 is initiated at block 305, where the device 104 may detect a pause condition indicative that a target pause operation is to be performed. For example, the pause condition may be a roam condition, scan condition, or the like.

Example scanning and/or roaming conditions may include detecting that a signal strength to the home access point 120 is below a threshold strength, that a quality of service (e.g., as determined based on jitter, latency, etc.) is below a predetermined threshold or other similar conditions.

In other examples, the roaming condition may be the identification of a new access point (such as the access point 124-1) to roam to. For example, when the signal strength to a foreign access point 124 is above a threshold strength (e.g., different from the threshold strength for the home access point 120), or when a quality of service is above a different predetermined threshold, the device 104 may identify or select the foreign access point 124 as a target access point to which to roam. That is, the roaming condition may be detected after a roam scan is performed and the access point 124-1 is selected as a new access point to roam to.

Other implementations of roaming or scanning conditions are also contemplated. For example, a scanning operation may be requested by a device application or service (e.g., including operating system-based requests), for locationing purposes, when other wireless scans (e.g., Bluetooth low energy) are being performed, and the like.

The device 104 may also identify parameters of the pause condition, including a type of the target pause operation (e.g., indicating a scan, a roam, etc.), a length of the target pause operation, and the like.

At block 310, in response to detecting the pause condition, the device 104 obtains a connection status of the peer device 112. Specifically, the connection status of the peer device 112 may indicate that the peer device 112 has a pause operation which is ongoing, that a target pause operation of the peer device 112 is detected (i.e., and no pause operation is ongoing), or a normal connection to its access point with no target pause operations and no pause operation which is ongoing. In some examples, the device 104 may obtain the connection status of the peer device 112 by sending a request and receiving a response, while in other examples, the device 104 may infer the connection status of the peer device 112.

Figure 4:
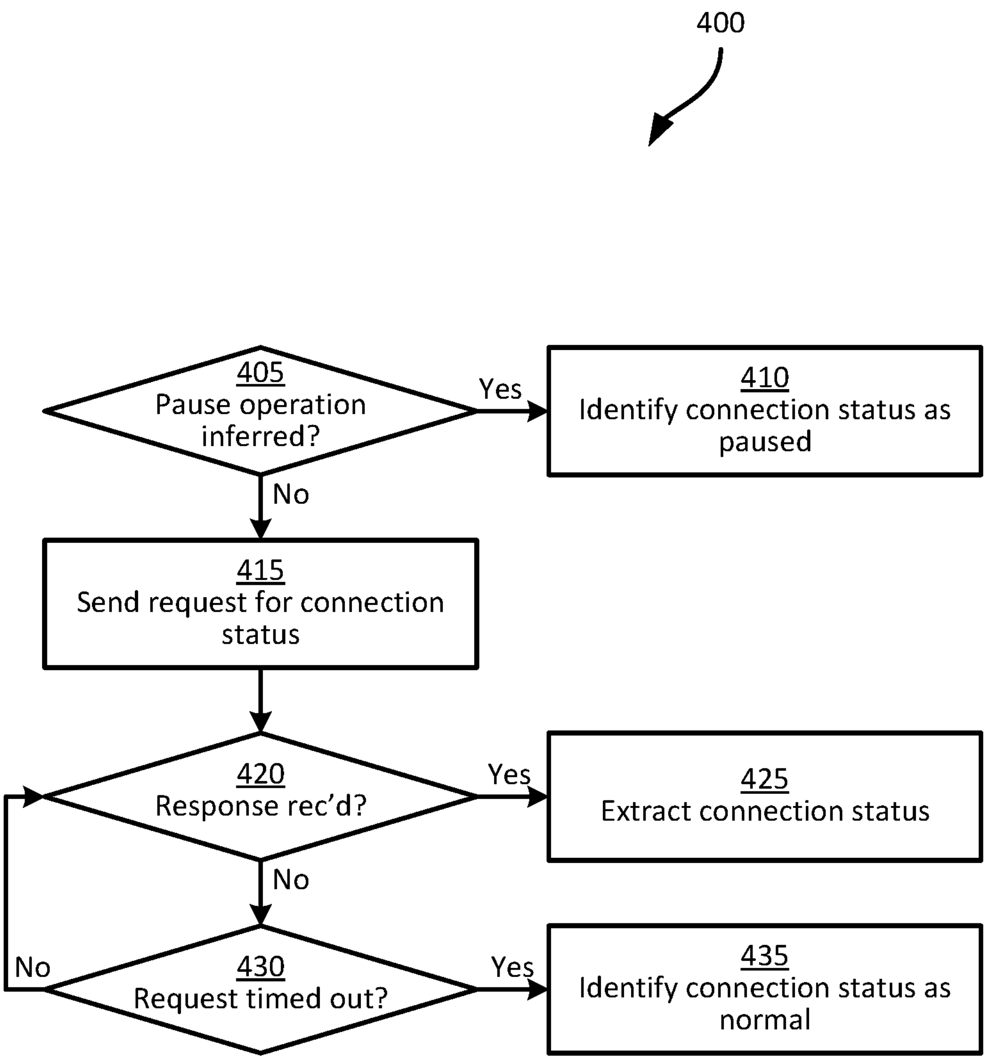
FIG. 4 is a schematic diagram of an example performance of obtaining a connection status of the peer device at block 310 of the method of FIG. 3.

For example, referring to FIG. 4, an example method 400 of obtaining the connection status of a peer computing device is depicted.

At block 405, the device 104 determines whether the device 104 can infer a pause operation of the peer device 112 as being ongoing.

For example, the peer device 112 may be configured to inform the device 104 prior to performing a pause operation at the peer device 112. Upon receiving such an indication, the device 104 may record the connection status of the peer device 112 as having an ongoing pause operation. Accordingly, if the recorded connection status of the peer device 112 indicates an ongoing pause operation, the device 104 may simply assume that the peer device 112 has an ongoing pause operation and make an affirmative determination at block 405.

In some examples, the device 104 may further verify that the recorded connection status indicating the ongoing pause operation can be assumed to be valid. For example, if the length of the indicated pause operation has not yet passed, and no subsequent packets have been received from the peer device 112, then the device 104 may assume that the pause operation of the peer device 112 remains ongoing and make an affirmative determination at block 405.

If the length of the indicated pause operation has passed and/or subsequent packets have been received from the peer device 112, then the device 104 may determine that the pause operation of the peer device 112 has in fact been completed and may update the recorded connection status to reflect the normal connection status. The device 104 may further make a negative determination at block 405.

If the determination at block 405 is affirmative, that is, the device 104 can infer an ongoing pause operation, then the device 104 proceeds to block 410. At block 410, the device 104 identifies the connection status of the peer device 112 as being paused—that is, having an ongoing pause operation and may proceed to block 315 of the method 300.

If the determination at block 405 is negative, that is, the device 104 cannot infer that a pause operation at the peer device 112 is ongoing, then the device 104 proceeds to block 415. At block 415, the device 104 sends a request to the peer device 112 for the connection status of the peer device 112. For example, the device 104 may include the request as part of a packet in the ongoing packet exchange (e.g., to exchange voice packets during a voice call). In some examples, the device 104 may include the request on more than one packet for redundancy and to increase the likelihood that the request is received at the peer device 112.

In some examples, the request may additionally include parameters of the target pause operation detected at block 305. That is, the request may include a type of the target pause operation, the length of the target operation and other relevant information to allow the peer device 112 to determine a priority order with the same information as the device 104.

At block 420, the device 104 determines whether it has received a response to the request for the connection status of the peer device 112. For example, the device 104 may examine packets received from the peer device 112 to determine whether any of the packets include a response.

If, at block 420, the device 104 has received a response from the peer device 112, then the device 104 proceeds to block 425. At block 425, the device extracts the connection status of the peer device 112 from the response. In particular, the connection status may indicate that the peer device 112 also has a respective target pause operation in addition to parameters of the target pause operation (i.e., type of pause operation, length of pause operation, etc.). In other examples, the connection status may indicate that the peer device 112 has not detected a target pause operation of the peer device and is maintaining normal connection to its access point. Having extracted the connection status of the peer device 112, the device 104 may then proceed to block 315 of the method 300.

If, at block 420, the device 104 has not yet received a response from the peer device 112, then the device 104 proceeds to block 430. At block 430, the device 104 determines whether the request sent at block 415 has timed out. For example, upon sending the request at block 415, the device 104 may initiate a timer for a predefined period within which the device 104 expects to receive a response from the peer device 112. If a response is not received from the peer device 112 within the predefined period, then the device 104 may assume, for example, that the peer device 112 does not have pause operation desynchronization capabilities.

In other examples, additionally or alternatively, the device 104 may determine whether the request sent at block 415 has timed out based on packets received from the peer device 112. That is, if one or more packets have been received from 112 subsequent to the request without having received a response, the device 104 may similarly assume that no response is incoming, for example, due to the peer device 112 not having pause operation desynchronization capabilities.

If, at block 430, the request sent at block 415 has not yet timed out, then the device 104 returns to block 420 to continue to check for a response from the peer device 112.

If, at block 430, the request sent at block 415 has timed out, then the device 104 proceeds to block 435. At block 435, the device 104 may assume the connection status of the peer device 112 to have no detected target pause operation and no pause operation which is ongoing and hence that the peer device 112 is maintaining normal connection to its access point. That is, the device 104 may identify the connection status of the peer device 112 as being normal.

Returning to FIG. 3, after obtaining the connection status of the peer device 112, the device 104 proceeds to block 315. At block 315, the device 104 determines a priority order of the device 104 and the peer device 112 based on the connection status of the peer device 112 obtained at block 310 and the pause condition detected at block 305, and more specifically, parameters of the target pause operation.

In particular, the device 104 may designate one of the device 104 and the peer device 112 as having first priority, and the other device as having second priority in the priority order. The designation of the priority order may be based on a set of predefined rules, mutually shared between the device 104 and the peer device 112 to ensure that the devices 104 and 112 determine the same priority order, and hence are able to coordinate desynchronization of the respective target pause operations.

Figure 5:
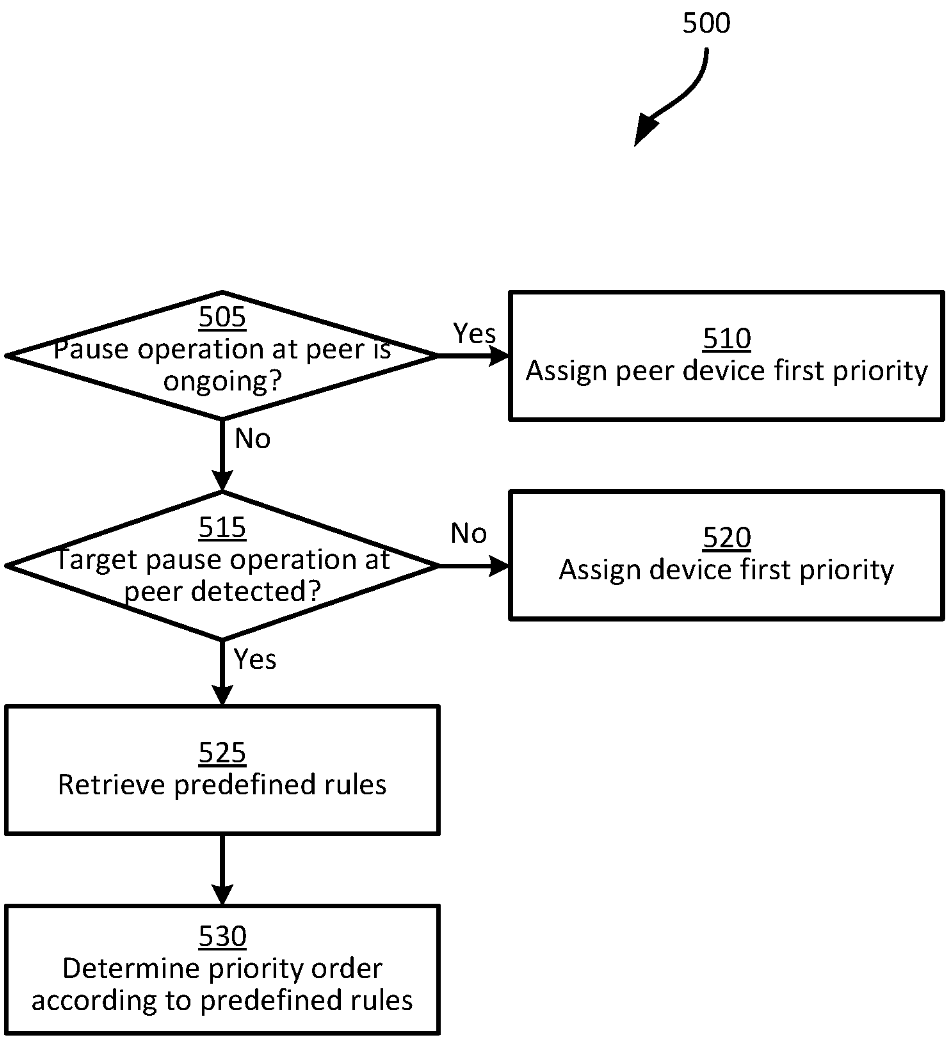
FIG. 5 is a schematic diagram of an example performance of determining a priority order at block 315 of the method of FIG. 3.

For example, referring to FIG. 5, a flowchart of an example method 500 for determining a priority order is depicted.

At block 505, the device 104 determines whether a pause operation of the peer device 112 is ongoing, for example based on the connection status determined at block 310.

If, at block 505, the device 104 determines that a pause operation of the peer device 112 is currently ongoing, then the device 104 proceeds to block 510 to determine that the peer device 112 has first priority and that the device 104 has second priority.

If, at block 505, the device 104 determines that no pause operation of the peer device 112 is ongoing, then the device 104 proceeds to block 515. At block 515, the device 104 determines whether the connection status of the peer device 112 indicates that the peer device 112 has detected a target pause operation of the peer device 112 and has no pause operation which is ongoing.

If, at block 515, the device 104 determines that the peer device 112 has not detected a target pause operation of the peer device 112, then the device 104 proceeds to block 520 to determine that the device 104 has first priority and the peer device 112 has second priority.

If, at block 515, the device 104 determines that the peer device 112 has detected a target pause operation, then the device 104 proceeds to block 525. At block 525, the device 104 retrieves a set of predefined priority rules governing the priority order, for example, from the memory 204. In particular, the set of predefined rules are mutually shared between the device 104 and the peer device 112 to allow the devices 104 and 112 to arrive at the same priority order. The set of predefined rules may define the priority order, for example based on the type of pause operation of each of the devices 104 and 112, based on the time of the request for pause operation information (e.g., the request at block 415 of the method 400), or other relevant pause operation parameters.

At block 530, the device 104 determines the priority order according to the set of predefined rules.

For example, the device 104 optionally compare the sum of the respective lengths of the target pause operations to the jitter buffer for the packet exchange application. If the jitter buffer is sufficient to accommodate both the pause operations—that bis, both pause operations may be completed within the time allotted for the jitter buffer, then the device 104 may assign both the device 104 and the peer device 112 as having first priority. In still further examples, if the jitter buffer for the application supporting the packet exchange is configurable, the device 104 may expand the jitter buffer to accommodate both pause operations and assign both the device 104 and the peer device 112 as having first priority.

The device 104 may additionally compare the type of the target pause operation of each of the devices 104 and 112. If the peer device 112 has the target pause operation with higher priority type, then the peer device 112 may be assigned first priority at block 510, while if the device 104 has the target pause operation with the higher priority type, then the device 104 may be assigned first priority at block 520.

If the device 104 and the device 112 have target pause operations of the same type, then the set of predefined rules may indicate that the device initiating the exchange of pause operation information (i.e., at block 415 of the method 400) may be assigned first priority.

In other examples, the set of predefined rules may provide for different priority order assignments based on other parameters, for example based on the respective signal strengths of the devices to their respective access points (e.g., to determine an urgency of the pause operation), or the like.

Returning again to FIG. 3, after determining the priority order of the device 104 and the peer device 112, the device 104 proceeds to block 320. At block 320, the device 104 pauses its connection to the home access point 120 according to the determined priority order.

Figure 6:
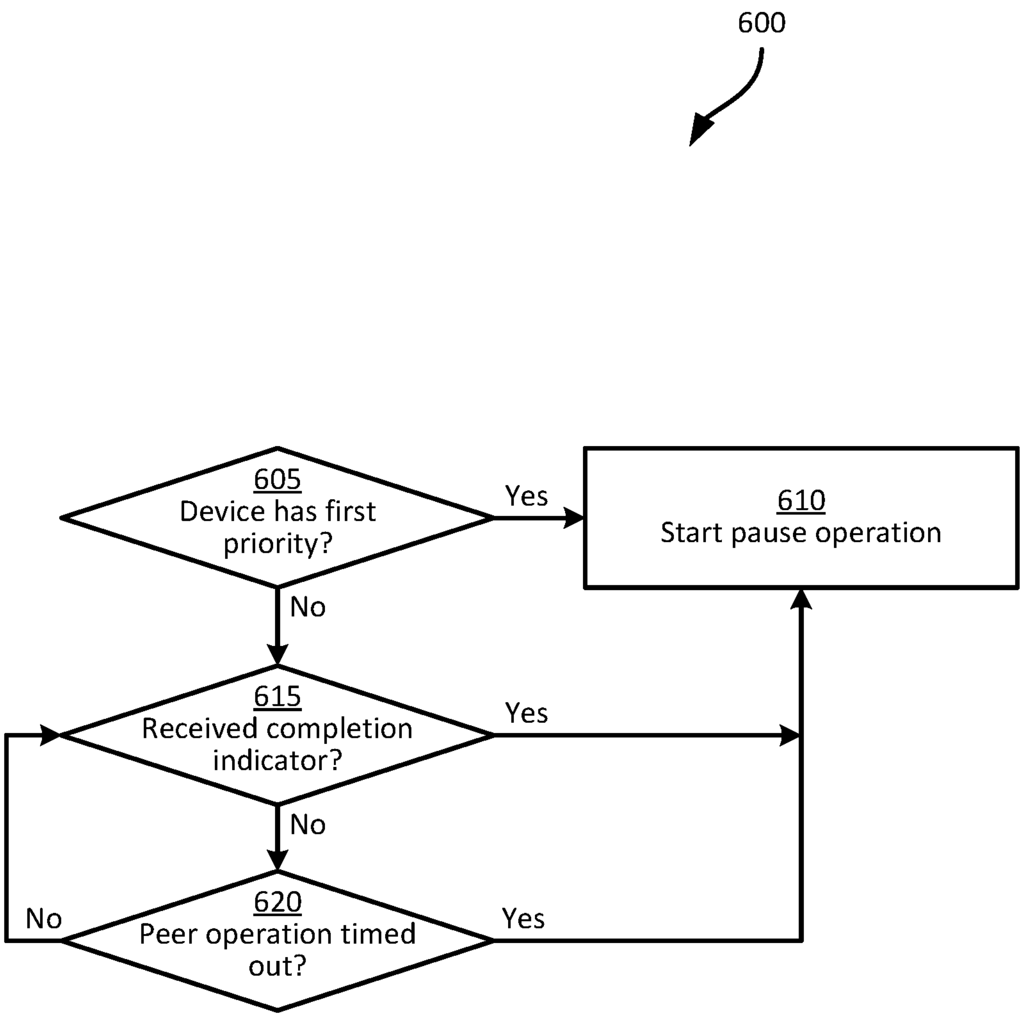
FIG. 6 is a schematic diagram of an example performance of pausing a connection to an access point according to a determined priority order at block 320 of the method of FIG. 3.

For example, FIG. 6 depicts a flowchart of an example method 600 of pausing a connection to an access point according to a determined priority order.

At block 605, the device 104 determines if it has first priority in the determined priority order. If the device 104 has first priority, then the device 104 proceeds to block 610 to start the pause operation. That is, at block 610, the device 104 pauses its connection to the home access point 120. Upon reconnecting to the home access point 120 after the pause operation, the device 104 may resume packet exchange with the peer device 112, and may send a completion indicator indicating completion of the pause operation at the device 104.

If, at block 605, the device 104 determines that it does not have first priority, then the device 104 proceeds to block 615. That is, since the device 104 does not have first priority, the device 104 determines that it is to wait for a pause operation of the peer device 112 to be completed prior to initiating the target pause operation of the computing device. Accordingly, at block 615, the device 104 determines whether or not it has received a completion indicator from the peer device 112, where the completion indicator indicates completion of the pause operation at the peer device 112.

The completion indicator may be included, for example, in a voice packet received from the peer device 112. That is, the peer device 112 may be configured to include the completion indicator as part of a packet once the peer device 112 has reconnected to its access point and has resumed the ongoing packet exchange.

In other examples, the completion indicator may be inferred, for example, by the fact of receiving a packet from the peer device 112 after a threshold time period from determining the priority order. That is, after the priority order has been determined and the device 104 determines that it does not have first priority, the device 104 may assume that the peer device 112 will proceed with its pause operation, and hence may expect a pause in receipt of packets from the peer device 112. Accordingly, any packets received after a threshold period of time from determining the priority order (i.e., to account for buffered packets sent by the peer device 112 prior to initiating the pause operation), may be assumed to be from the peer device 112 after the pause operation is complete.

If, at block 615, the device 104 has received a completion indicator from the peer device 112, the device 104 proceeds to block 610 to start its target pause operation.

If, at block 615, the device 104 has not received a completion indicator from the peer device 112, the device 104 proceeds to block 620. At block 620, the device 104 determines whether the peer pause operation has timed out. For example, upon determining that the peer device 112 has first priority, the device 104 may set a timer based on the length of the target pause operation of the peer device 112. If the timer has expired, then the device 104 may assume that the peer device 112 has completed its pause operation, and hence the device 104 is able to start its pause operation.

Accordingly, if the peer pause operation has timed out at block 620, the device 104 proceeds to block 610 to start its target pause operation.

If the peer pause operation has not yet timed out at block 620, the device 104 returns to block 615 to check for a completion indicator.

Accordingly, the device 104 may desynchronize its target pause operation from the peer pause operation of the peer device 112, thereby reducing the likelihood that the jitter buffer will be exceeded and reducing the impact of the pause operations to the ongoing packet exchange (i.e., by reducing the number of packets dropped).

Figure 7:
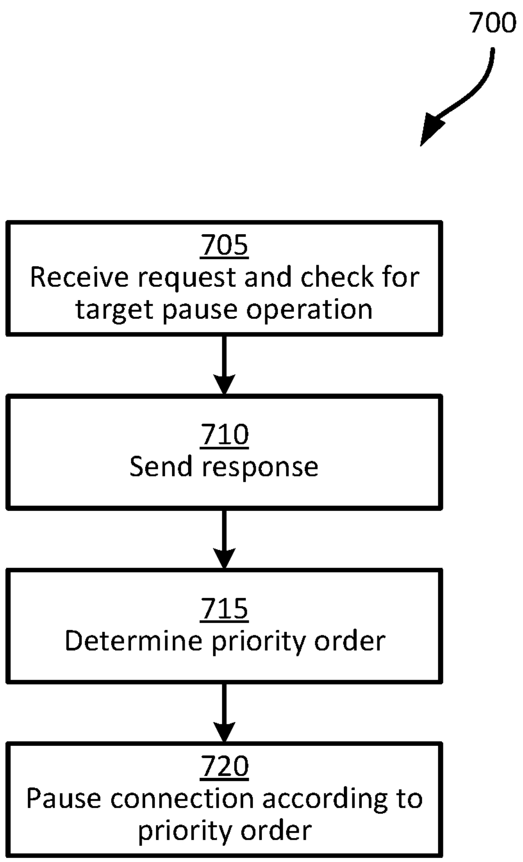
FIG. 7 is a schematic diagram of an example performance of responding to a request for a connection status.

Turning now to FIG. 7, a flowchart of an example method 700 of responding to a request for connection status is depicted. The method 700 may be performed, for example, at the peer device 112 in response to the request sent at block 415 by the device 104.

At block 705, the peer device 112 receives the request for the connection status and checks for any upcoming target pause operations. For example, the peer device 112 may check its signal strength to the access point to which it is connected, or the like, to determine whether a scan or a roam operation may be imminent. For example, if the signal strength is below a threshold strength or if the quality of service is below a predetermined threshold, the peer device 112 may predict an upcoming pause operation (i.e., detect a target pause operation). The threshold strength and/or other predetermined thresholds may be the same or different as the threshold strength and other predetermined thresholds for initiating a scan or a roam.

If an upcoming pause operation is identified, the peer device 112 may also determine parameters of the peer pause operation, including a type of the pause operation, a length of the pause operation, and the like.

At block 710, the peer device 112 sends a response to the request for the connection status based on the results determined at block 705. That is, if an upcoming pause operation is identified, the response may include an indication of the upcoming pause operation and parameters of the pause operation. If no upcoming pause operation is identified, the response may include an indication that the peer device 112 is undergoing normal connection to its access point.

At block 715, the peer device 112 determines the priority order of the device 104 and the peer device 112 based on the connection status of the peer device 112 identified at block 705 and parameters of the target pause operation of the device 104 as received, for example, with the request for the connection status. The device 112 may designate one of the device 104 and the peer device 112 as having first priority, and the other device as having second priority in the priority order. The designation of the priority order may be based on the set of predefined rules which is mutually shared between the device 104 and the peer device 112 to ensure that the devices 104 and 112 determine the same priority order, and hence are able to coordinate desynchronization of the respective pause operations. Determination of the priority order may be performed, for example, using the same method 500 as performed by the device 104.

At block 720, the peer device 112 pauses its connection to its access point according to the determined priority order. For example, the peer device 112 may pause its connection in an equivalent manner as the device 104 based on the method 600. That is, if the peer device 112 is designated as having first priority, it may proceed with the pause operation, while if the peer device 112 is designated as having second priority, it may wait until a completion indicator is received from the device 104 before initiating the target pause operation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including." "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device comprising:

a wireless communications interface configured to connect to a network deployed by a plurality of access points;

a controller for the wireless communications interface, the controller configured to, during an ongoing packet exchange with a peer computing device:

detect a target pause operation for the computing device to pause a connection to a home access point;

in response to the target pause operation, obtain a connection status of the peer computing device;

determine a priority order of the computing device and the peer computing device based on the connection status and the target pause operation; and pause the connection to the home access point according to the determined priority order, wherein, to determine the priority order, the controller is configured to: when the connection status indicates that a target pause operation of the peer device is detected and the peer device has no pause operation which is ongoing, retrieve a set of predefined priority rules and determine the priority order based on the set of predefined priority rules.

2. The computing device of claim 1, wherein the controller is further configured to send a request to the peer computing device for the connection status.

3. The computing device of claim 2, wherein the request includes parameters of the target pause operation to allow the peer device to determine the priority order based on the connection status and the target pause operation.

4. The computing device of claim 1, wherein the controller is configured to infer the connection status as being paused.

5. The computing device of claim 1, wherein, to determine the priority order, the controller is configured to assign the peer device as having first priority in the priority order when the connection status indicates that a pause operation of the peer device is ongoing.

6. The computing device of claim 1, wherein, to determine the priority order, the controller is configured to assign the computing device as having first priority in the priority order when the connection status indicates that the peer device has not detected a target pause operation of the peer device and has no pause operation which is ongoing.

7. The computing device of claim 1, wherein, to determine the priority order, the controller is configured to:

when a jitter buffer is sufficient to accommodate a target pause operation of the peer device and the target pause operation of the computing device, assign both the peer device and the computing device as having first priority in the priority order.

8. The computing device of claim 7, wherein the controller is further configured to: when the jitter buffer is configurable, expand the jitter buffer to accommodate the target pause operation of the peer device and the target pause operation of the computing device.

9. The computing device of claim 1, wherein the controller is configured to, when the peer device has first priority in the priority order, wait for a completion indicator from the peer device prior to pausing the connection to the home access point, the completion indicator indicating completion of a pause operation of the peer device.

10. The computing device of claim 1, wherein the controller is configured to send a completion indicator to the peer device, the completion indicator indicating completion of the target pause operation of the computing device.

11. A method in a computing device during an ongoing packet exchange with a peer device, the method comprising:

detecting a target pause operation for the computing device to pause a connection to a home access point:

in response to the target pause operation, obtaining a connection status of the peer device:

determine a priority order of the computing device and the peer device based on the connection status and the target pause operation; and pause the connection to the home access point according to the determined priority order, wherein determining the priority order comprises:

retrieving a set of predefined priority rules and determining the priority order based on the set of predefined priority rules in response to determining that the connection status indicates that a target pause operation of the peer device is detected and the peer device has no pause operation which is ongoing.

12. The method of claim 11, further comprising sending a request to the peer device for the connection status.

13. The method of claim 12, wherein the request includes parameters of the target pause operation to allow the peer device to determine the priority order based on the connection status and the target pause operation.

14. The method of claim 11, further comprising inferring, at the computing device, the connection status of the peer device as being paused.

15. The method of claim 11, wherein determining the priority order comprises:

assigning the peer device as having first priority in the priority order when the connection status indicates that a pause operation of the peer device is ongoing.

16. The method of claim 11, wherein determining the priority order comprises:

assigning the computing device as having first priority in the priority order when the connection status indicates that the peer device has not detected a target pause operation of the peer device and has no pause operation which is ongoing.

17. The method of claim 11, wherein determining the priority order comprises:

when a jitter buffer is sufficient to accommodate a target pause operation of the peer device and the target pause operation of the computing device, assign both the peer device and the computing device as having first priority in the priority order.

18. The method of claim 17, further comprising:

when the jitter buffer is configurable, expand the jitter buffer to accommodate the target pause operation of the peer device and the target pause operation of the computing device.

19. The method of claim 11, further comprising, when the peer device has first priority in the priority order, waiting for a completion indicator from the peer device prior to pausing the connection to the home access point, the completion indicator indicating completion of a pause operation of the peer device.

20. The method of claim 11, further comprising sending a completion indicator to the peer device, the completion indicator indicating completion of the target pause operation of the computing device.

21. A method in a computing device during an ongoing packet exchange with a peer device, the method comprising:

detecting a target pause operation for the computing device to pause a connection to a home access point:

in response to the target pause operation, obtaining a connection status of the peer device:

determine a priority order of the computing device and the peer device based on the connection status and the target pause operation; and pause the connection to the home access point according to the determined priority order, wherein determining the priority order comprises:

assigning the computing device as having first priority in the priority order in response to the connection status indicating that the peer device has not detected a target pause operation of the peer device and has no pause operation which is ongoing.

* * * * *